US008880036B2

(12) United States Patent
Ibrahim

(10) Patent No.: US 8,880,036 B2
(45) Date of Patent: Nov. 4, 2014

(54) RETRIEVING DATA WIRELESSLY FROM A MOBILE DEVICE

(75) Inventor: Wael M. Ibrahim, Cypress, TX (US)

(73) Assignee: QUALCOMM Incorporated, San Diego, CA (US)

( * ) Notice: Subject to any disclaimer, the term of this patent is extended or adjusted under 35 U.S.C. 154(b) by 1145 days.

(21) Appl. No.: 12/206,167

(22) Filed: Sep. 8, 2008

(65) Prior Publication Data

US 2010/0062744 A1    Mar. 11, 2010

(51) Int. Cl.
| | | |
|---|---|---|
| H04M 1/725 | (2006.01) | |
| H04M 1/663 | (2006.01) | |
| G06F 21/33 | (2013.01) | |
| H04M 1/2745 | (2006.01) | |
| G06F 11/14 | (2006.01) | |

(52) U.S. Cl.
CPC ...... *H04M 1/7253* (2013.01); *H04M 1/274516* (2013.01); *G06F 11/1469* (2013.01); *G06F 21/33* (2013.01); *G06F 11/1464* (2013.01)
USPC .... 455/412.2; 455/41.2; 455/410; 455/414.1; 455/557; 709/246; 709/219; 707/647; 707/674

(58) Field of Classification Search
CPC ............ G06F 11/1469; G06F 11/1402; G06F 21/6218; G06F 11/1148; G06F 11/1456; H04M 1/7253; H04M 1/274516; H04M 1/6041; H04M 2250/02; H04M 2250/64; H04M 1/72519; H04W 12/12; H04W 8/18; H04L 12/5895; H04L 51/38; H04L 63/0428
USPC ........................................................ 455/412.1
See application file for complete search history.

(56) References Cited

U.S. PATENT DOCUMENTS

| | | | |
|---|---|---|---|
| 6,662,023 B1 * | 12/2003 | Helle | 455/558 |
| 7,340,244 B1 | 3/2008 | Osborne et al. | |
| 2003/0233583 A1 * | 12/2003 | Carley | 713/201 |
| 2004/0240653 A1 | 12/2004 | Ramian | |
| 2005/0208967 A1 * | 9/2005 | Buniatyan | 455/557 |
| 2005/0250522 A1 | 11/2005 | Gilbert et al. | |
| 2005/0283662 A1 * | 12/2005 | Li et al. | 714/13 |
| 2005/0288043 A1 | 12/2005 | Lai et al. | |
| 2008/0060086 A1 * | 3/2008 | Bhansali et al. | 726/35 |
| 2009/0040028 A1 * | 2/2009 | Price et al. | 340/10.51 |

\* cited by examiner

*Primary Examiner* — Quan M Hua
(74) *Attorney, Agent, or Firm* — Kilpatrick Townsend & Stockton LLP

(57) ABSTRACT

A system comprises a processing device including a storage device. The system further comprises a wireless mobile device ("WMD") in wireless communication with the processing device. The processing device registers the WMD and stores the registration in the system memory, receives a request for retrieval of data located in the WMD, authenticates the request based on the registration, and retrieves the data wirelessly based on the authentication.

15 Claims, 2 Drawing Sheets

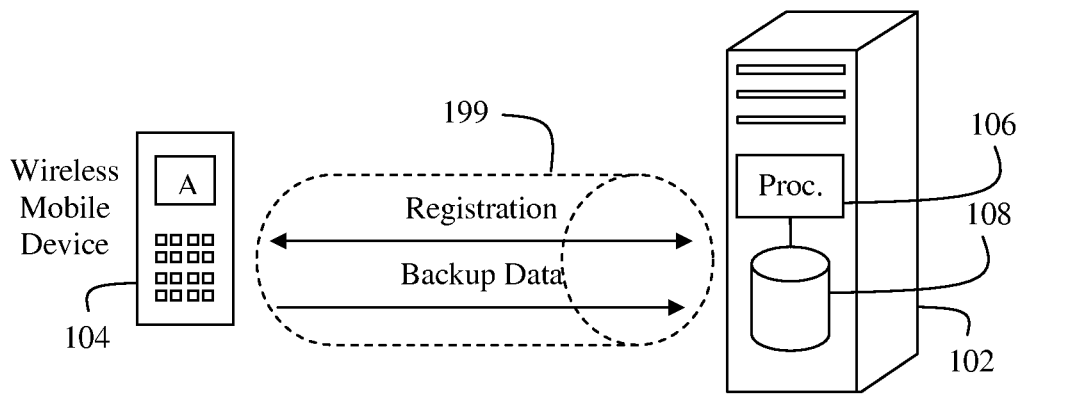
Figure 1
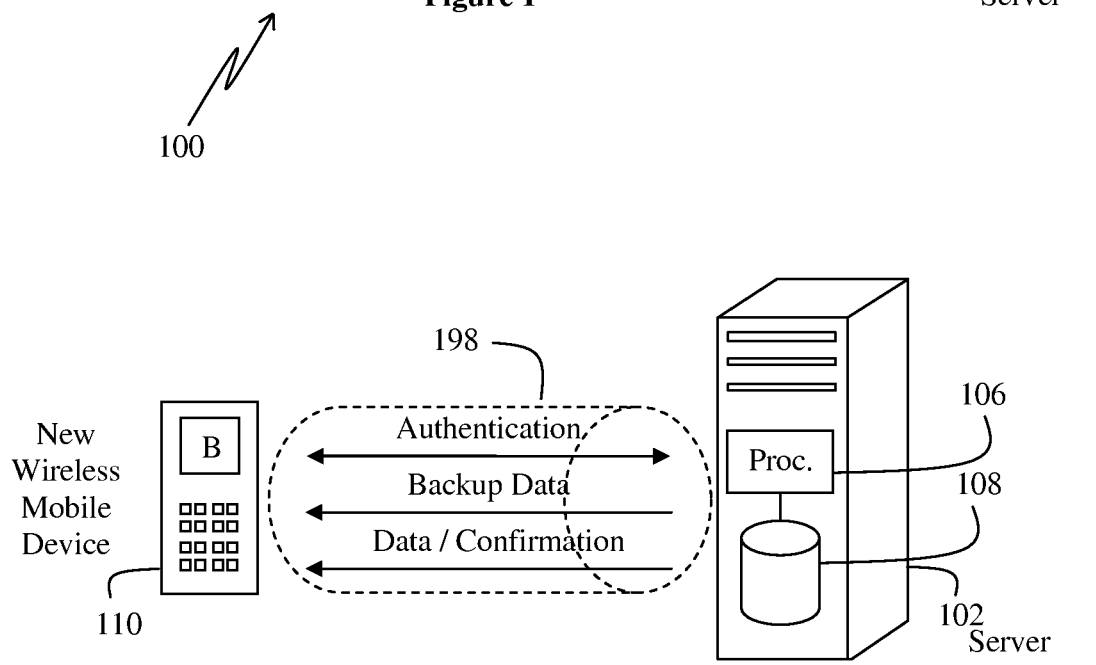
Figure 2
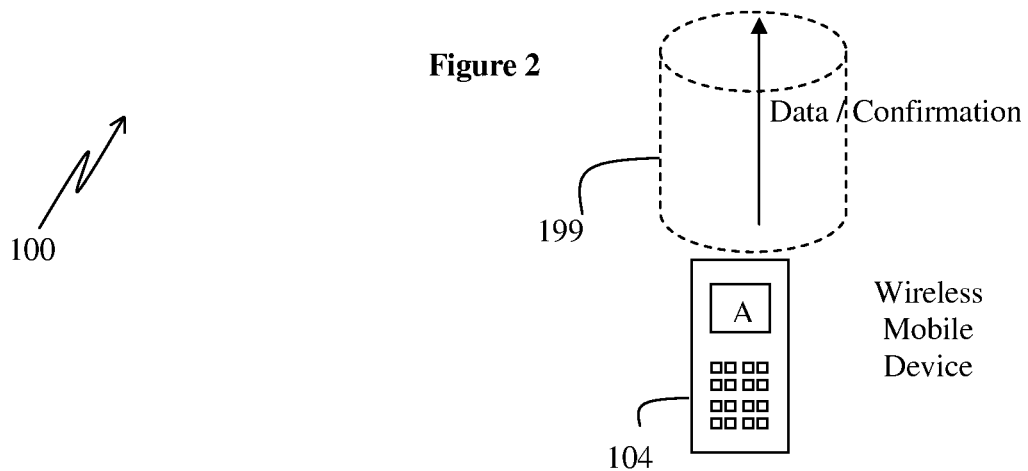

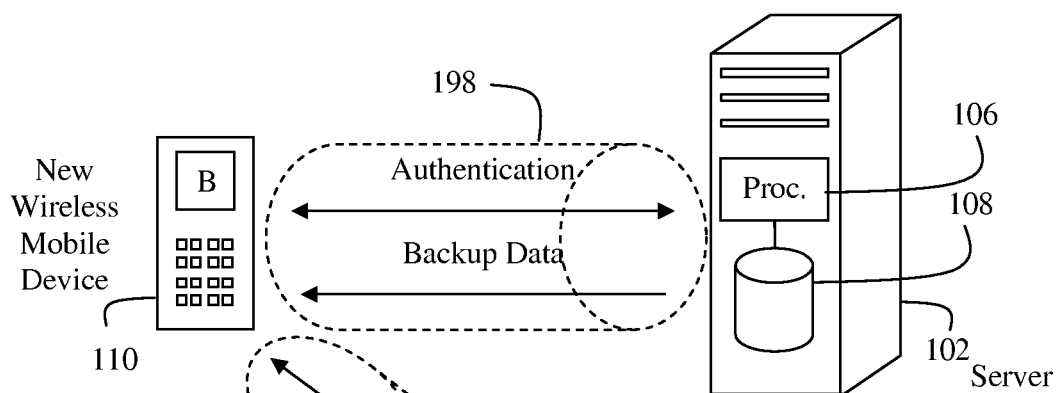
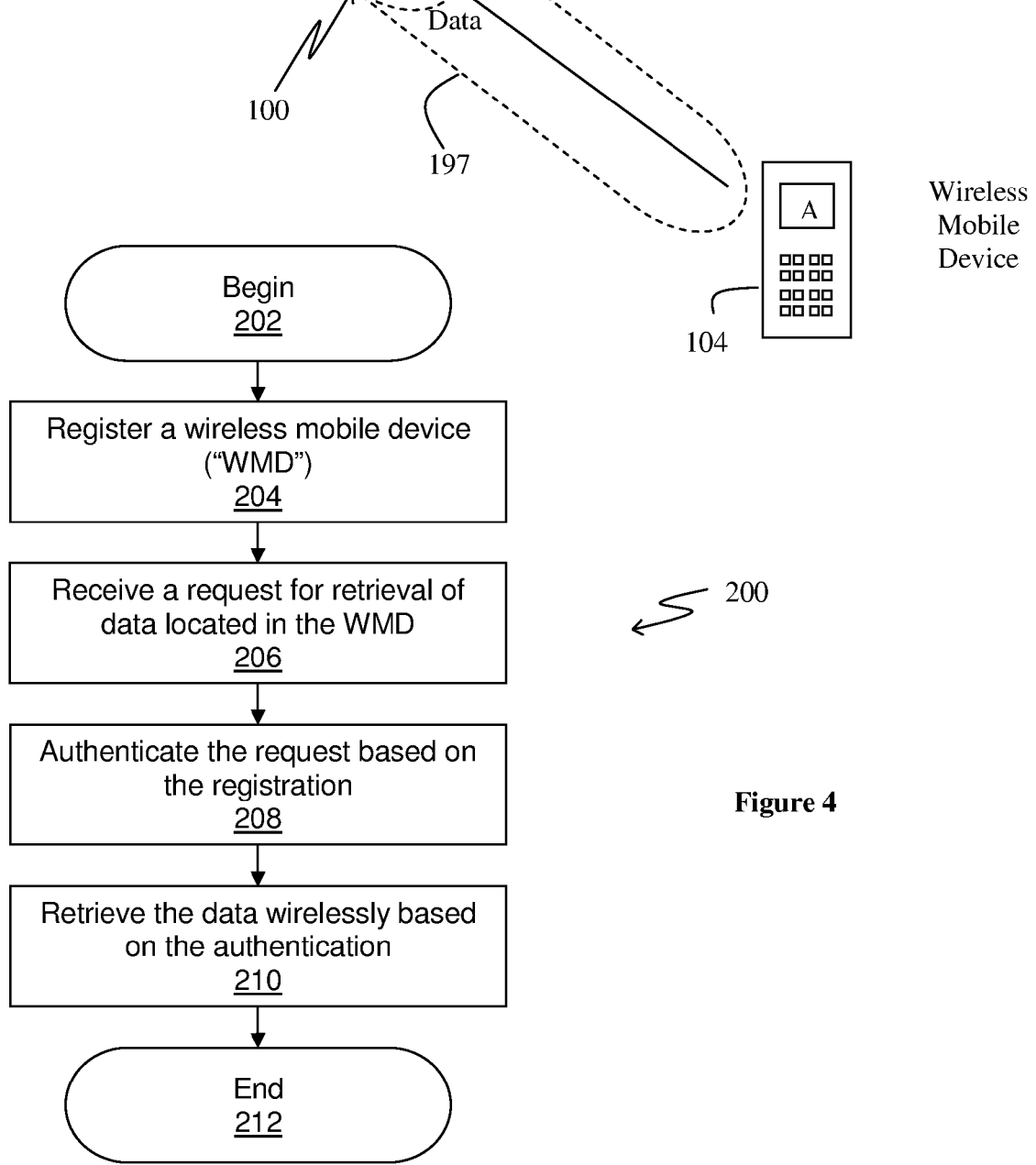

RETRIEVING DATA WIRELESSLY FROM A MOBILE DEVICE

BACKGROUND

Wireless mobile devices ("WMDs") can be easily misplaced, lost, or stolen due to their portable nature. However, WMDs are increasingly being used to store sensitive data, such as contact information data and in some cases banking and retail information. As such, securing a WMD, and/or the data contained therein, from loss, theft, and the like is of paramount importance.

BRIEF DESCRIPTION OF THE DRAWINGS

For a detailed description of the embodiments of the invention, reference will now be made to the accompanying drawings in which:

FIG. 1 shows a system of registering a wireless mobile device for wireless data retrieval in accordance with at least one embodiment;

FIG. 2 shows a system for wireless data retrieval in accordance with at least one embodiment;

FIG. 3 shows a system for wireless data retrieval in accordance with at least one embodiment; and FIG. 4 shows a method for wireless data retrieval in accordance with at least one embodiment.

NOTATION AND NOMENCLATURE

Certain terms are used throughout the following claims and description to refer to particular components. As one skilled in the art will appreciate, different entities may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean an optical, wireless, indirect electrical, or direct electrical connection. Thus, if a first device couples to a second device, that connection may be through a direct electrical connection, through an indirect electrical connection via other devices and connections, through an optical connection, or through a wireless connection. Additionally, the term "system" refers to a collection of two or more hardware components, and may be used to refer to an electronic device.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

FIG. 1 shows a system 100 for registering a wireless mobile device ("WMD") for a wireless data retrieval service. The system 100 preferably comprises a server 102, an original WMD 104 (labeled "A" in the drawings). The server can be under the control of a service provider that provides the use of the WMD with wireless access or service. Alternatively, the server can be under the control of any party, including the user of the WMD. The server 102 preferably comprises a processor 106 and a system memory or storage device 108 coupled to the processor 106. The server 102 can be a personal computer, personal digital assistant ("PDA"), another mobile device, network storage devices, mainframe, and any computing device having a processor and storage device. However, any combination of hardware and software is within the scope of this disclosure. In at least one embodiment, the server 102 is a network of computers able to register and service many WMDs contemporaneously. The original WMD 104 is preferably a cellular phone ("cell phone"). However, the original WMD 104 can be any type of mobile device, such as without limitation, a portable notebook, PDA, cell phone, calculator, and the like. In at least one embodiment, many WMDs of different types are registered and serviced by the server 102 contemporaneously. The original WMD 104 communicates with the server through a wireless link 199 such as, without limitation, a wireless local area network ("WLAN"), Wi-Fi, Fixed Wireless Data, Worldwide Interoperability for Microwave Access ("WiMAX"); Global System for Mobile Communications ("GSM"), Personal Communication Service ("PCS"), Advanced Mobile Phone Service ("AMPS"), Time Division Multiple Access ("TDMA"), Code Division Multiple Access ("CDMA"), Wireless Application Protocol ("WAP"), Wireless Markup Language ("WML"), Bluetooth, Broadband Wireless ("BL"), Local Multi-Point Distribution Service ("LMDS"); Multi-Channel Multi-Point Distribution Service ("MMDS"), Cellular Digital Packet Data ("CDPD"), High Speed Circuit Switched Data ("HSCSD"), Packet Data Cellular ("PDC"), Infrared Data Association ("IrDA"), Wireless Wide Area Network ("WWAN"), Wireless Personal Area Network ("WPAN"), and One Times Radio Transmission Technology ("1xRTT").

Preferably, the processor 106 registers the original WMD 104 and stores the registration in memory 108. In at least one embodiment, the registration process comprises the user of the original WMD 104 presenting a token to the processor 106, which the processor stores in memory 108. A token is preferably a unique identifier, e.g., a number, a string, a password, a combination of a username and password, a smart card, a combination of a smartcard and pin number, a fingerprint, a combination of fingerprints, etc. Each WMD in the system 100 is preferably associated with a unique token and/or user during registration. As can be appreciated, different registration interfaces can be used to allow the user to present different types of tokens, and any type of token and interface is within the scope of this document. For example, the user may register the original WMD 104 via the World Wide Web using an account password, via phone using voice recognition in combination with a fingerprint read by the original WMD 104, or in person at the service provider's physical location using a smartcard. Preferably, the processor 106 stores the token in memory 108 along with user information during registration for use in subsequent authentication.

In at least one embodiment, the registration process comprises a secure key exchange. Any type of secure key exchange is within the scope of this document. One type of secure key exchange uses a public key infrastructure ("PKI"). A PKI is an arrangement that binds public keys with respective user identities by means of a trusted third party certificate authority. A PKI enables parties without prior contact to be authenticated to each other and to use the public key information in their public key certificates to encrypt messages to each other. Another type of secure key exchange is the Diffie- Hellman ("DH") key exchange. The DH key exchange is a cryptographic protocol that allows two parties that have no prior knowledge of each other to jointly establish a shared secret key over an insecure communications channel. This key can then be used to encrypt subsequent communications using a symmetric key cipher. Although two examples of key exchanges have been described, any type of key exchange is within the scope of this disclosure. The secure key exchange enables encrypted communication between the service provider and the original WMD 104, and enables decryption of data retrieved from the original WMD 104.

In at least one embodiment, data in the original WMD 104 is protected by a Trusted Platform Module ("TPM"). The TPM is a microprocessor, designed by the Trusted Computing Group, dedicated to cryptography. The TPM generates cryptographic keys using a pseudo-random number generator. Preferably, the data to be retrieved from the original WMD 104 is encrypted and decrypted as requested by the TPM using such a key for further security. The key comprises information generated and interpretable by the TPM, such as an opaque binary large object ("BLOB").

All data in the original WMD 104 is capable of being backed up and retrieved wirelessly. However, in at least one embodiment, the user specifies what type of information in the original WMD 104 should be able to be backed up and/or retrieved by notifying the service provider using the phone, the World Wide Web, etc. For example, the user may select to only have the user's address book backed up by the service provider, and the user may also select that all types of data be retrievable. Considering another example, the user may select to have credentials backed up by the service provider, and the user may also select to have only credentials and phone settings be retrievable. Considering another example, the user may select to have no data backed up, and the user may also select that only data within a certain location on the original WMD 104 be retrievable. The ability to specify what type of data should be backed up and/or retrievable allows the service provider to conserve resources and pass any savings along to the customer in the form of a reduced rate service plan. As can be appreciated, many data types and many combinations of data to be backed up and/or made retrievable are possible. Any type and combination is within the scope of this disclosure. For clarity and explanatory purposes, all data on the original WMD 104 is selected by the user to be backed up, and such selection has been made via the World Wide Web during registration. Such data will be referred to as "backup data."

The processor 106 preferably stores the backup data in memory 108. In at least one embodiment, the processor 106 periodically scans the original WMD 104 for changes to the backup data. If changes are found, the processor 106 preferably stores the changes in memory 108 along with a timestamp such that the backup data as it appeared at a particular time can be restored. Such scanning can take place remotely, even during operation of the original WMD 104, so that the user is not required to bring the original WMD 104 to the service provider or otherwise change the user's phone usage habits. Preferably, the user can specify and change the periodicity of the scans. As such, any saving of resources caused by infrequent scanning can be passed to the customer.

FIG. 2 shows the system 100 after the original WMD 104 has been misplaced, lost, stolen, or is generally unavailable and the user has acquired a second WMD 110 (labeled "B" in the drawings). Alternatively, the user may have a second WMD 110 for which the user wants to store data contained in the first WMD. The second WMD 110 communicates with the server 106 over a wireless link 198 of any type as described above. The second WMD 110 may be of a different make and model than the original WMD 104, use a different communication standard than the original WMD 104, or be a different type of device, e.g., the second WMD 110 is a PDA while the original WMD 104 is a cell phone. However, in at least one embodiment, the second WMD 110 has the identical communication standard and hardware as the original WMD 104. The user wants the second WMD 110 to contain all the data of the original WMD 104, but the user notes that the most recent backup occurred a week prior to the unavailability of the original WMD 104. Thus, the most recent backup of the original WMD 104 will not contain data added to the original WMD 104 during the week between backup and unavailability. The only location of this data is in the unavailable original WMD 104, and the user wants this data on the second WMD 110 as well. In the drawings, this data is labeled "Data," while the data stored in the most recent backup is labeled "Backup Data." The user requests retrieval of the backup data and data located only in the original WMD 104. The processor 106 receives the request.

The processor 106 authenticates the request based on the registration information saved in memory 108. Preferably, authentication comprises requesting a token, receiving a token, and comparing the received token with the token saved during registration. If the tokens match, or compare favorably in the case that fingerprints are used, then the authentication is successful, and data retrieval can continue. If the tokens do not match, or do not compare favorably, the authentication is unsuccessful and the user's request is denied.

Upon successful authentication, the processor 106 wirelessly sends backup data stored in memory 108 from the most recent backup (or from the backup of a particular time, if desired) to the second WMD 110. The restoration of data onto the second WMD 110 preferably occurs remotely so that the user need not bring the second WMD 110 to the service provider.

For the data located only in the original WMD 104, the processor 106 retrieves the data from the original WMD 104 wirelessly. In at least one embodiment, retrieving the data comprises sending a request signal for the data to the original WMD 104 via signaling over control channels ("control signals"). In response, the data is sent from the original WMD 104 to the server 102, where the data is stored in memory 108. Subsequently, the processor 106 wirelessly sends the data to the second WMD 110. The restoration of data onto the second WMD 110 preferably occurs remotely so that the user need not bring the second WMD 110 to the service provider. In at least one embodiment, the processor 106 uses the registration stored in memory 108 to determine which data to retrieve. Specifically, the registration comprises the user-selected preferences regarding which data should be retrieved.

If the original WMD 104 is not receiving control signals, the processor preferably detects when the original WMD 104 is receiving control signals and subsequently retrieves the data. With the actual user's permission, the data is copied from the original WMD 104 to the server 102 such that a user in physical possession of the original WMD (a thief or finder of the WMD) 104 may not detect the copying. Specifically, no external sounds or visuals should be generated other than those in response to normal operation. In at least one embodiment, the data is retrieved despite the original WMD 104 being inoperable by a user. Specifically, the original WMD 104 will not respond to inputs from a user in physical possession of the original WMD 104, but the original WMD 104 will send the data nonetheless because the original WMD 104 still receives control signals.

Preferably, the original WMD 104 stores power dedicated to facilitate remote retrieval of the data. Such power can be generated by a secondary battery of the original WMD 104, or by a partition of the primary battery, one section dedicated to powering the original WMD 104 during data retrieval. Hence, a user in physical possession of the original WMD 104 will perceive the original WMD 104 to be off, and may even disconnect the primary battery from the original WMD 104, but retrieval of the data is still possible. In at least one embodiment, the stored power is also used to help locate the unavailable original WMD 104, e.g., by powering a Global Positioning System ("GPS") locator.

Preferably, the data is encrypted during retrieval. Any encryption and decryption technique is within the scope of this disclosure. In at least one embodiment, an operation is performed on the data located in the original WMD. For example, the operation can be a copy operation, delete operation, move operation, etc., although any operation is within the scope of this disclosure. By performing a delete or move operation on data within the unavailable original WMD 104, the security of the data is increased. Preferably, the processor 106 receives confirmation of success of the operation and communicates the confirmation to the second WMD 110.

To simplify the user experience, a "clone" operation is preferably offered. Specifically, the clone operation will restore all backup data and data retrieved from the original WMD 104, including e.g., phone settings, to the second WMD 110, delete all data on the original WMD 104, disable the subscriber identity module ("SIM") card in the original WMD 104, and lock and/or disable all operations of the original WMD 104. The data on the second WMD 110 will be identical to the data on the original WMD 104 in every respect.

In at least one embodiment, the data travels from the original WMD 104 to the second WMD 110 without passing through the server 102, as illustrated in FIG. 3. Preferably, the second WMD 110 retrieves the data wirelessly based on authentication by the server 102. In at least one embodiment, retrieving the data wirelessly comprises the processor 106 signaling the original WMD 104 to send the data to the second WMD 110 and comprises the original WMD 104 sending the data to the second WMD 110. In another embodiment, retrieving the data wirelessly comprises the second WMD 110 signaling the original WMD 104 to send the data to the second WMD 110 and comprises the original WMD 104 sending the data to the second WMD 110. The second WMD 110 communicates with the original WMD 104 over a wireless link 197 of any type as described above. The signal can be in the form of a voice call, SMS request, etc.

FIG. 4 illustrates a method 200, beginning at step 202 and ending at step 212, of retrieving data wirelessly from a WMD as described above. At step 204, the original WMD 104 is registered with a server 102, the registration is stored in memory 108 At step 206, a request for the retrieval of data located in original WMD 104 is received. The request includes certain information need to authenticate the user which is stored in memory 108. At step 208, the request is authenticated based on the registration information stored in memory 108. At step 210 the backup data is transmitted wirelessly based on the success of the authentication.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   a server processing device, including a storage device, configured to wirelessly communicate with a first wireless mobile device ("WMD") and to wirelessly communicate with a second WMD separate from the first WMD and in wireless communication with both the server processing device and the first WMD;
   wherein the server processing device is configured to:
   register the first WMD and store the registration in the storage device;
   receive a request wirelessly, from the second WMD, for retrieval of data located in the first WMD;
   authenticate the request based on the registration;
   authorize retrieval of the data wirelessly based on the authentication;
   send a request signal to the first WMD over a control channel in response to the authorization to facilitate the retrieval of data;
   responsive to the request signal, establish by the first WMD a direct communication channel with the second WMD; and
   send the data, based on a preference setting, by the first WMD to the second WMD over the established communication channel, wherein the sending is independent of any user input and operational mode for the first WMD.

2. The system of claim 1, wherein the first WMD comprises a device selected from the group consisting of cellular phone and personal digital assistant.

3. The system of claim 1, wherein the data is retrieved despite the first WMD being inoperable by any user.

4. The system of claim 1, wherein the processing device synchronizes backup data with the first WMD.

5. The system of claim 1, wherein, when the server processing device receives the request, the data is located only in the first WMD.

6. The system of claim 1, wherein the data in the first WMD is protected by a Trusted Platform Module ("TPM").

7. The system of claim 1, wherein the first WMD stores power dedicated to facilitate remote retrieval of the data.

8. The system of claim 1, wherein:
   an operation is performed on the data located in the first WMD, the operation selected from a group consisting of copy, delete, and move; and
   wherein the server processing device receives confirmation of success of the operation.

9. A system, comprising:
   a processor;
   a system memory coupled to the processor;
   a first wireless mobile device ("WMD"); and
   a second WMD not comprising the processor;
   wherein the processor is configured to;
   register the first WMD and store the registration in the system memory;
   receive a request wirelessly, from the second WMD, for retrieval of data located in the first WMD;
   authenticate the request based on the registration;
   authorize retrieval of the data wirelessly based on the authentication;
   send a request signal to the first WMD over a control channel in response to the authorization to facilitate the retrieval of data;
   responsive to the request signal, establish by the first WMD a direct communication channel with the second WMD;
   send the data, based on a preference setting, by the first WMD to the second WMD over the established communication channel, wherein the sending is independent of any user input and operational mode for the first WMD.

10. The system of claim 9, wherein the data is retrieved despite the first WMD being inoperable by any user.

11. A method, comprising:
   at a server device, registering a first wireless mobile device ("WMD") and storing the registration;
   receiving a request wirelessly from a second WMD for retrieval of data located in the WMD, wherein the second WMD is distinct from the first WMD;
   authenticating the request based on the registration;
   authorizing retrieval of the data wirelessly directly from the first WMD;
   sending a request signal to the first WMD over a control channel in response to the authorization to facilitate the retrieval of data;
   responsive the request signal, establishing by the first WMD a direct communication channel with the second WMD; and
   sending the data, based on a preference setting, by the first WMD to the second WMD over the established communication channel, wherein the sending is independent of any user input and operational mode for the first WMD.

12. The method of claim 11, wherein the first WMD is inoperable by any user.

13. The system of claim 1, wherein the data comprises an address book.

14. The system of claim 1, wherein the owner specifies a type of data to be retrieved.

15. The system of claim 1, wherein the data comprise phone settings.

* * * * *